United States Patent
Wang et al.

(10) Patent No.: US 11,635,656 B2
(45) Date of Patent: Apr. 25, 2023

(54) BACKLIGHT MODULE AND DISPLAY APPARATUS

(71) Applicants: Beijing BOE Optoelectronics Technology Co., Ltd., Beijing (CN); BOE Technology Group Co., Ltd., Beijing (CN)

(72) Inventors: Qiuli Wang, Beijing (CN); Lei Chen, Beijing (CN); Zhiqiang Wang, Beijing (CN); Xin Ma, Beijing (CN); Chuan Sun, Beijing (CN); Jianfeng Yao, Beijing (CN); Xinyu Wang, Beijing (CN); Dingyang Tan, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/344,054

(22) Filed: Jun. 10, 2021

(65) Prior Publication Data
US 2021/0405452 A1 Dec. 30, 2021

(30) Foreign Application Priority Data
Jun. 29, 2020 (CN) .......................... 202010607434.3

(51) Int. Cl.
*G02F 1/1335* (2006.01)
*F21V 8/00* (2006.01)

(52) U.S. Cl.
CPC ..... *G02F 1/133607* (2021.01); *G02B 6/0043* (2013.01); *G02B 6/0053* (2013.01); *G02F 1/133524* (2013.01)

(58) Field of Classification Search
CPC ............ G02F 1/133607; G02B 6/0053; G02B 6/0043
See application file for complete search history.

(56) References Cited

U.S. PATENT DOCUMENTS

| | | |
|---|---|---|
| 2011/0058389 A1 | 3/2011 | Shiau et al. |
| 2014/0146561 A1* | 5/2014 | Yuki ............... G02B 6/0033 362/606 |
| 2020/0132913 A1* | 4/2020 | Tang ............... G02B 5/045 |

FOREIGN PATENT DOCUMENTS

| | | | | |
|---|---|---|---|---|
| CN | 101566289 A | | 10/2009 | |
| CN | 101299112 B | * | 6/2011 | ....... G02F 1/133606 |

(Continued)

OTHER PUBLICATIONS

CN Office Action dated Oct. 11, 2021 for CN Application No. 202010607434.

*Primary Examiner* — Karabi Guharay
(74) *Attorney, Agent, or Firm* — Workman Nydegger (57) ABSTRACT

The present disclosure discloses a backlight module and a display apparatus. A microprism film layer is further arranged on a light emitting side of a light guide plate, and the microprism film layer is located in a range of a preset distance by which the light guide plate extends from a side close to a light source to a side away from the light source; and the microprism film layer includes a plurality of first microprism structures, and the first microprism structures are configured to make an incident angle of light at a first interface when entering the first microprism structures greater than an emitting angle of the light at the first interface when exiting from the first microprism structures when the light in the light guide plate enters the first microprism structures from the light guide plate and then enters the light guide plate from the first microprism structures.

14 Claims, 6 Drawing Sheets

(56) References Cited

FOREIGN PATENT DOCUMENTS

| | | | | |
|---|---|---|---|---|
| CN | 103150062 B | * | 5/2016 | |
| CN | 109212660 A | * | 1/2019 | ........... G02B 6/0038 |
| CN | 111045256 A | | 4/2020 | |

* cited by examiner

BACKLIGHT MODULE AND DISPLAY APPARATUS

CROSS-REFERENCE TO RELATED APPLICATION

This application is based on and claims priority under 35 U.S.C 119 to Chinese Patent Application No. 202010607434.3, filed on Jun. 29, 2020, in the China National Intellectual Property Administration. The entire disclosure of the above application is incorporated herein by reference.

FIELD

The present disclosure relates to the technical field of display, in particular to a backlight module and a display apparatus.

BACKGROUND

In recent years, pointed backlight has been more and more applied to vehicle high-brightness display, notebook anti-peek display, VR high-brightness display and the like because of its advantages in adjustability of light emitting brightness angle and forward brightness and the like.

There are mainly two ways to realize the pointed backlight: an inverse prism pointed backlight module formed by an inverse prism and a matched light guide plate, and a grating pointed backlight module with a grating introduced into the traditional backlight. Among them, the grating pointed backlight module is usually combined with a liquid crystal panel to realize naked-eye 3D display, but the number of viewing points is usually limited; and the inverse prism pointed backlight module is widely applied because it is not limited by the number of viewing points and is relatively less difficult to process.

SUMMARY

The embodiment of the present disclosure provides a backlight module, including: a light source, a light guide plate, an inverse prism film layer and a microprism film layer, wherein the light emitted by the light source is incident into the light guide plate in a side-entry mode;

the light guide plate is provided with a plurality of dots on a backlight side thereof;

the refractive index of the microprism film layer is same as that of the light guide plate, the microprism film layer is located on the light emitting side of the light guide plate, and the microprism film layer is located in a range of a preset distance by which the light guide plate extends from a side close to the light source to a side away from the light source; and the microprism film layer includes a plurality of first microprism structures, the first microprism structures are configured to make an incident angle of light at a first interface when entering the first microprism structures greater than an emitting angle of the light at the first interface when exiting from the first microprism structures in response to that the light in the light guide plate entering the first microprism structures from the light guide plate and then entering the light guide plate from the first microprism structures, and the first interface is an interface between the light guide plate and the first microprism structures.

Optionally, in the backlight module provided by some embodiments of the present disclosure, a cross-section of each of the first microprism structures in a first direction is a triangle, a base angle of the side of the triangle away from the light source ranges from 2° to 10°, and the first direction is a direction perpendicular to the light source.

Optionally, in the backlight module provided by some embodiments of the present disclosure, a height of the triangle is 2 µm to 5 µm.

Optionally, in the backlight module provided by the embodiment of the present disclosure, a base angle of the side of the triangle close to the light source ranges from Arcsin (1/n) to 90°, and n is the refractive index of the microprism film layer; and a cross-section of each of the first microprism structures in a second direction is a trapezoid, a base angle of the trapezoid ranges from Arcsin (1/n) to 90°, and the second direction is a direction parallel to the light source.

Optionally, in the backlight module provided by some embodiments of the present disclosure, the length of the bottom edge of the trapezoid is 20 µm to 70 µm; and the length of the bottom edge of the triangle is 20 µm to 70 µm.

Optionally, in the backlight module provided by some embodiments of the present disclosure, the first microprism structures in the microprism film layer are arranged on the light emitting side of the light guide plate in a two-dimensional array;

a row direction of the two-dimensional array is parallel to the light source, and a column direction of the two-dimensional array is perpendicular to the light source;

a spacing between centers of two adjacent first microprism structures in the column direction is 0.1 mm to 0.3 mm; and a spacing between centers of two adjacent first microprism structures in the row direction is 0.1 mm to 0.4 mm.

Optionally, in the backlight module provided by some embodiments of the present disclosure, the light guide plate and the microprism film layer are of an integrated structure.

Optionally, in the backlight module provided by some embodiments of the present disclosure, a pattern of the dots and a pattern of the first microprism structures are mirror-symmetrical about the light guide plate.

Optionally, in the backlight module provided by some embodiments of the present disclosure, an inverse prism sheet is further included; and the microprism film layer is located between the inverse prism sheet and the light guide plate.

Correspondingly, some embodiments of the present disclosure further provide a display apparatus, including: a liquid crystal display panel and any one of the backlight modules provided by above embodiments.

DETAILED DESCRIPTION OF THE EMBODIMENTS

Figure 1:
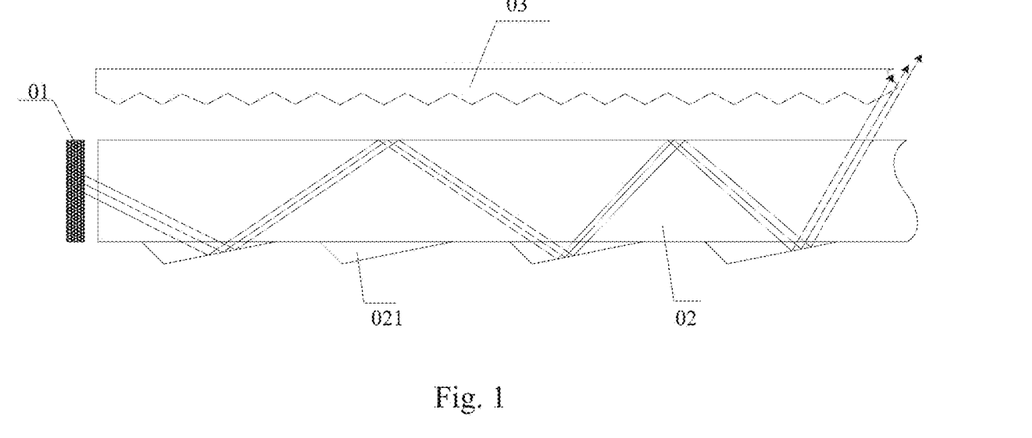
FIG. 1 is a schematic structural diagram of an existing backlight module.

The structure of an inverse prism pointed backlight module is as shown in FIG. 1, including: a light source 01, a light guide plate 02 and an inverse prism 03 on a light emitting side of the light guide plate. The light guide plate 02 is provided with dots 021 on a backlight side, and due to the arrangement of the dots 021, a light emitting direction is fixed. However, a light emitting area of the light may be reduced, so that the closer to the light resource 01 side, the less light is emitted, and thus the phenomenon of darkness near the light source side is shown on the whole, especially in a small-sized backlight module.

In view of this, some embodiments of the present disclosure provide a backlight module and a display apparatus, so as to improve the phenomenon that the backlight module is dark near the light source side.

In order to make the above-mentioned objects, features and advantages of the present disclosure more obvious and understandable, the present disclosure will be further described below with reference to the accompanying drawings and embodiments. However, the example embodiments can be implemented in various forms, and should not be construed as being limited to the implementations set forth herein; on the contrary, the provision of these embodiments makes the present disclosure more comprehensive and complete, and fully conveys the concept of the example implementations to those skilled in the art. The same reference numerals in the figures indicate the same or similar structures, and thus their repeated description will be omitted. The words expressing positions and directions described in the present disclosure are all illustrated by taking the drawings as examples, but changes can also be made according to needs, and the changes made are all included in the protection scope of the present disclosure. The drawings of the present disclosure are only used for illustrating the relative position relationship and do not represent the true scale.

It should be noted that specific details are set forth in the following description in order to fully understand the present disclosure. However, the present disclosure can be implemented in many other ways different from those described herein, and those skilled in the art can make similar generalizations without violating the connotation of the present disclosure. Therefore, the present disclosure is not limited by the specific implementations disclosed below. The following description of the specification is exemplary implementations for implementing the present application, but the description is for the purpose of explaining the general principles of the present application, and is not intended to limit the scope of the present application. The protection scope of the present application shall be subjected to those defined by the appended claims.

The backlight module and the display apparatus provided by some embodiments of the present disclosure will be described below with reference to the accompanying drawings.

Figure 2:
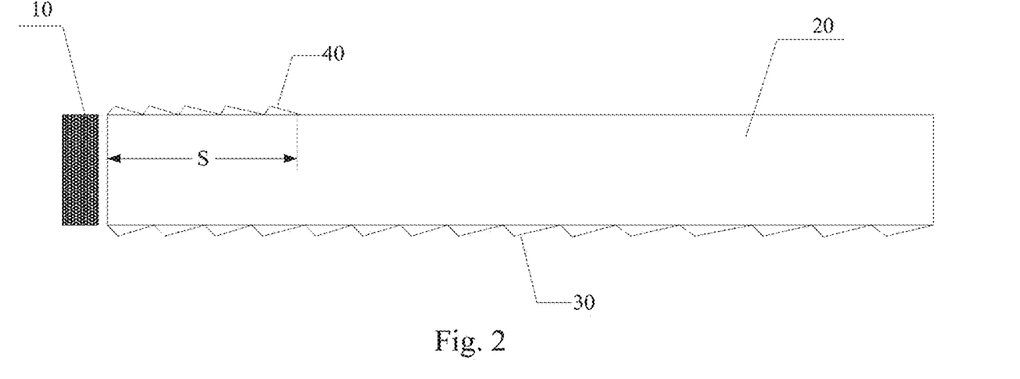
FIG. 2 is a first schematic cross-sectional view of a backlight module provided by an embodiment of the present disclosure.

A backlight module provided by an embodiment of the present disclosure, as shown in FIG. 2, includes: a light source 10, a light guide plate 20 and a microprism film layer 40.

Light emitted by the light source 10 is incident into the light guide plate 20 in a side-entry mode.

The light guide plate 20 is provided with a plurality of dots 30 on a backlight side.

The refractive index of the microprism film layer 40 is the same as that of the light guide plate 20, the microprism film layer 40 is located on a light emitting side of the light guide plate 20, and the microprism film layer 40 is located in a range of a preset distance S by which the light guide plate 20 extends from a side close to the light source 10 to a side away from the light source 10.

Figure 3:
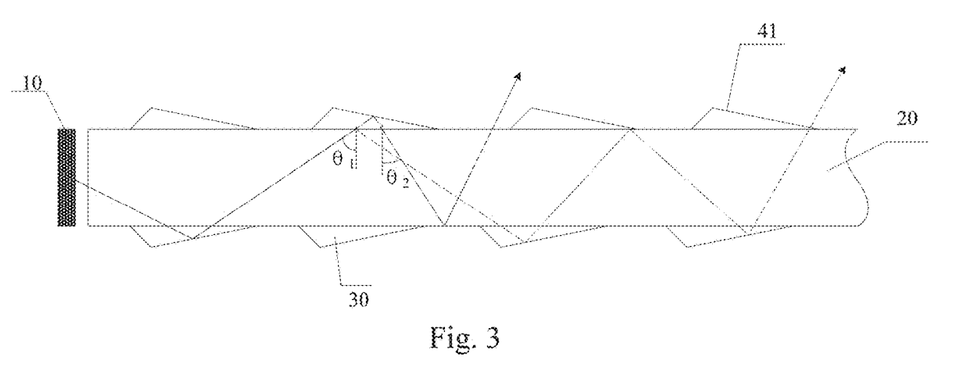
FIG. 3 is a schematic diagram of an optical path of a backlight module provided by an embodiment of the present disclosure.

As shown in FIG. 3, the microprism film layer 40 includes a plurality of first microprism structures 41, the first microprism structures 41 are configured to make an incident angle $\theta_1$ of light at a first interface when entering the first microprism structures 41 greater than an emitting angle $\theta_2$ of the light at the first interface when exiting from the first microprism structures 41 when the light in the light guide plate 20 enters the first microprism structures 41 from the light guide plate 20 and then enters the light guide plate 20 from the first microprism structures 41; and the first interface is an interface between the light guide plate 20 and the first microprism structures 41. Among them, in FIG. 3, the solid arrow indicates an optical path of the light with the microprism film layer, and the dotted line arrow indicates an optical path of the light without the microprism film layer.

In the backlight module provided by embodiments of the present disclosure, the microprism film layer is also arranged on the light emitting side of the light guide plate, the microprism film layer is located in the range of the preset distance by which the light guide plate extends from the side close to the light source to the side away from the light source, the microprism film layer includes a plurality of first microprism structures, and the first microprism structures are configured to make the incident angle of the light at the first interface when entering the first microprism structures greater than the emitting angle of the light at the first interface when exiting from the first microprism structures when the light in the light guide plate enters the first microprism structures from the light guide plate and then enters the light guide plate from the first microprism structures. Compared with no microprism film layer, it is equivalent to reducing the reflection angle of the light at the first interface (see FIG. 3, reduced from the original $\theta_1$ to $\theta_2$), so that the optical path of light emitting is shortened, and the light delay is reduced, thereby effectively improving the phenomenon that the backlight module is dark near the light source side without changing the backlight brightness viewing angle and the light emitting angle.

If the refractive index of the microprism film layer is different from the refractive index of the light guide plate, the total reflection light transmitted in the light guide plate may not be incident to the microprism structure film layer when it is not less than a critical angle of total reflection (that is, before it reaches the original optical path), so the effect of reducing the optical path is not realized. Therefore, in the present disclosure, the refractive index of the microprism film layer must be the same as that of the light guide plate. Optionally, the material of the microprism film layer is the same as that of the light guide plate.

Figure 4A:
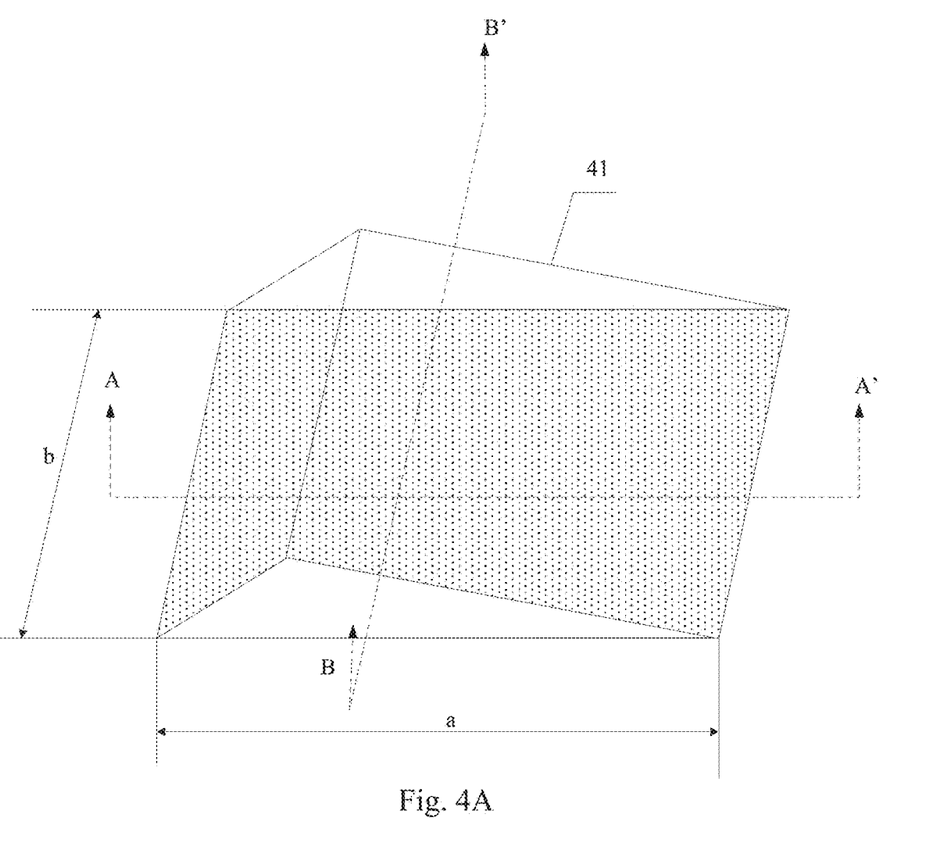
FIG. 4A is a schematic diagram of a first microprism structure in a backlight module provided by an embodiment of the present disclosure.
Figure 4B:
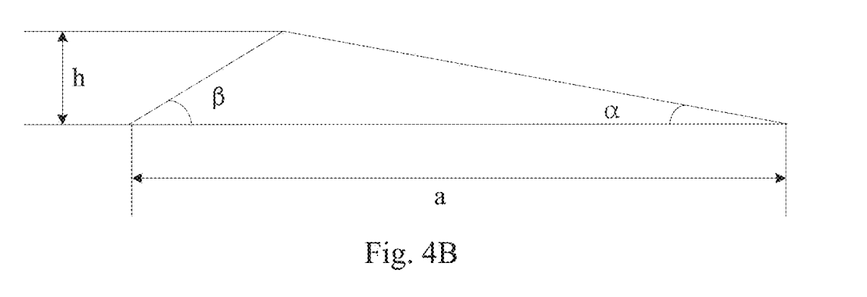
FIG. 4B is a schematic cross-sectional view of the first microprism structure in FIG. 4A in a first direction AA'.

Optionally, in the backlight module provided by embodiments of the present disclosure, as shown in FIGS. 4A and 4B, the cross-section of the first microprism structures 41 in the first direction AA' is a triangle, a base angle α of the side of the triangle away from the light source ranges from 2° to 10°, and the first direction AA' is a direction perpendicular to the light source.

In specific implementation, the larger the α, the shorter the optical path of the light emitting, on the basis that the area size of an inclined plane (the inclined plane which forms the angle α) which effectively shortens the optical path is not changed, the height h of the triangle may be larger, and when the backlight module is applied to VR display, the outline of the first microprism structures 41 is easily displayed due to the need to magnify the display frame. Therefore, the range of α can be further controlled between 2° and 5°, for example, 2°, 3°, 4° or 5°.

Optionally, in the backlight module provided by embodiments of the present disclosure, as shown in FIG. 4B, the height h of the triangle is 2 μm to 5 μm, for example, h is 2 μm, 3 μm, 4 μm or 5 μm, which is not limited herein.

Optionally, in the backlight module provided by embodiments of the present disclosure, as shown in FIG. 4B, a base angle β of the side close to the light source of the triangle only needs to be Arcsin (1/n) to 90°, wherein n is the refractive index of the microprism film layer, and Arcsin (1/n) is the critical angle of total reflection of the light in the light guide plate. This is because if β is greater than or equal to 90°, or β is less than Arcsin (1/n), the inclined plane constituting the angle β of the first microprism structures may change the direction of the emitted light, thereby generating stray light. However, if the angle β is smaller, the area of the inclined plane (the inclined plane which forms the angle α) which effectively shortens the optical path is smaller under the same length and width dimensions, the light which may shorten the optical path is less, and the angle β may not be too small or too large.

Figure 4C:
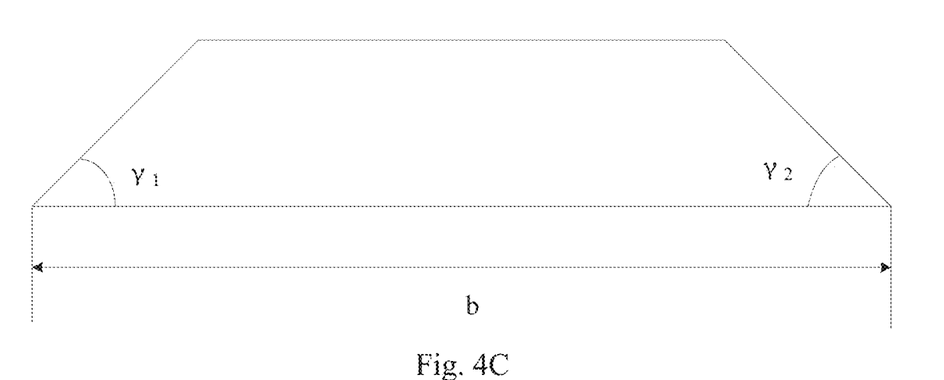
FIG. 4C is a schematic cross-sectional view of the first microprism structure in FIG. 4A in a second direction BB'.

Optionally, in the backlight module provided by embodiments of the present disclosure, as shown in FIGS. 4A and 4C, the cross-section of the first microprism structures in the second direction BB' is a trapezoid, and the second direction BB' is a direction parallel to the light source. Base angles $\gamma_1$ and $\gamma_2$ of the trapezoid only need to be Arcsin (1/n) to 90°, this is because if $\gamma_1$ or $\gamma_2$ is greater than or equal to 90°, or $\gamma_1$ or $\gamma_2$ is less than Arcsin (1/n), the inclined plane constituting the angle $\gamma_1$ or angle $\gamma_2$ of the first microprism structures may change the direction of the emitted light, thereby generating stray light. However, if the angle $\gamma_1$ or angle $\gamma_2$ is smaller, the area of the inclined plane (the inclined plane which forms the angle α) which effectively shortens the optical path is smaller under the same length and width dimensions, the light which may shorten the optical path is less, and the angle $\gamma_1$ or angle $\gamma_2$ may not be too small or too large.

Optionally, in the backlight module provided by embodiments of the present disclosure, $\gamma_1$ and $\gamma_2$ are equal.

In specific implementation, in the backlight module provided by embodiments of the present disclosure, the area of the bottom surfaces of the first microprism structures may not be set too large, the outline is prone to being recognized by human eyes when the area is too large, and if the area is too small, the technology processing is difficult. Therefore, considering all aspects, optionally, in the backlight module provided by the embodiment of the present disclosure, as shown in FIGS. 4A to 4C, the length of a bottom edge b of the trapezoid is 20 μm to 70 μm, and the length of a bottom edge a of the triangle is 20 μm to 70 μm. Further, the length of b is controlled within the range of 54+/−10 μm, and the length of a is controlled within the range of 58+/−10 μm.

Optionally, in the backlight module provided by embodiments of the present disclosure, the dots on the backlight side of the light guide plate are generally directly formed on the light guide plate by a dot collision method.

Optionally, in the backlight module provided by embodiments of the present disclosure, the microprism film layer may be directly formed on the light guide plate by the dot collision method. Thus, the light guide plate and the microprism film layer are of an integrated structure without changing the backlight thickness.

Further, in the backlight module provided by the embodiment of the present disclosure, the pattern of the dots is the same as the pattern of the first microprism structures. In this way, when the dots and the microprism film layer are formed on the light guide plate, one striker may be shared, thereby simplifying the manufacturing technology and reducing the production cost.

It should be noted that in the backlight module provided by the embodiment of the present disclosure, although the pattern of the dots is the same as the pattern of the first microprism structures, since the dots and the first microprism structures are located on the opposite sides of the light guide plate, if the positions of the dots and the first microprism structures are overlapped, the dots and the first microprism structures are mirror-symmetrical about the light guide plate. In specific implementation, since the arrangement of the dots is different from the arrangement of the first microprism structures, generally the positions of the dots and the first microprism structures may not be completely overlapped.

Figure 5:
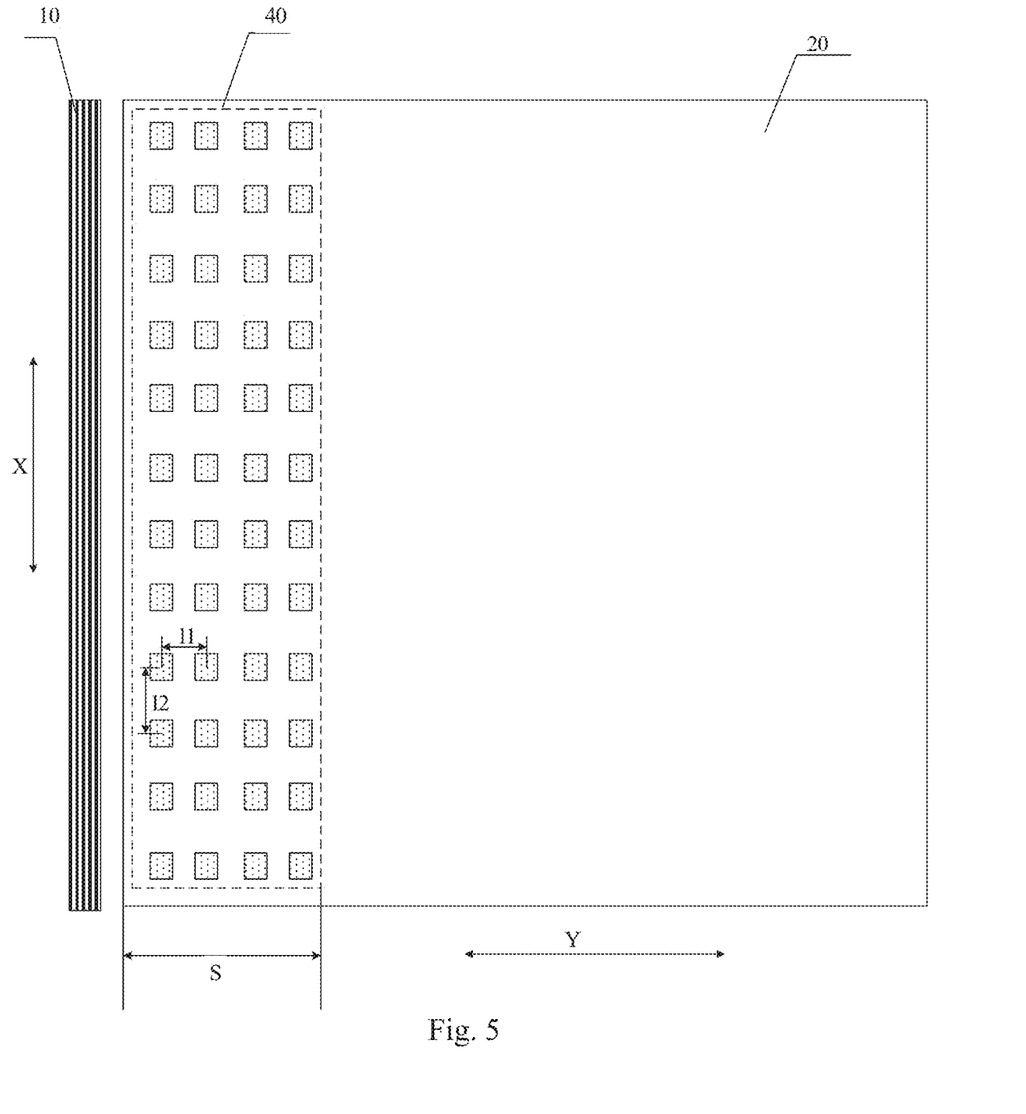
FIG. 5 is a schematic top view of a backlight module provided by an embodiment of the present disclosure.

Optionally, in the backlight module provided by embodiments of the present disclosure, as shown in FIG. 5, the plurality of first microprism structures 41 in the microprism film layer are arranged on the light emitting side of the light guide plate 20 in a two-dimensional array. A row direction X of the two-dimensional array is parallel to the light source 10, and a column direction Y of the two-dimensional array is perpendicular to the light source 10. The more regular the arrangement of the plurality of first microprism structures 41 is, the lower the manufacturing difficulty is, and thus arranging the plurality of first microprism structures in the two-dimensional array may reduce the manufacturing technology difficulty. Of course, the plurality of first microprism structures may further have other arrangement modes, such as the Bezier arrangement mode, which is not limited here.

In specific implementation, in some embodiments of the present disclosure, the distribution density of the first microprism structures arranged in the two-dimensional array may not be too large or too small. The large distribution density means a dense distribution, if the first microprism structures are distributed too densely, more light may be emitted on the side close to the light source, and thus the brightness of the side away from the light source may become dark. The small distribution density means a sparse distribution, the first microprism structures are distributed too sparsely, which is equivalent to less inclined plane area which may effectively shorten the optical path, consequently, the light which may shorten the optical path is less, and the effect of improving the dark backlight on the light source side is not obvious. Therefore, it is necessary to consider the spacing of the first microprism structures according to the implementation situation.

Optionally, in the backlight module provided by embodiments of the present disclosure, as shown in FIG. 5, a spacing l1 between centers of two adjacent first microprism structures 41 in the column direction Y may be designed to be 0.1 mm to 0.3 mm, such as 0.1 mm, 0.2 mm or 0.3 mm, which is not limited here. Similarly, a spacing l2 between centers of two adjacent first microprism structures 41 in the row direction X may be designed to be 0.1 mm to 0.4 mm, such as 0.1 mm, 0.2 mm, 0.3 mm or 0.4 mm, which is not limited here.

Optionally, in the backlight module provided by embodiments of the present disclosure, the spacing l1 between the centers of the two adjacent first microprism structures 41 in the column direction Y may be designed to be equal to the spacing l2 between the centers of the two adjacent first microprism structures 41 in the row direction X, which is not limited here.

Optionally, in a small-sized backlight module, such as a 2-3-inch backlight module, as shown in FIG. 5, a preset distance S is 8 mm to 15 mm, such as 8 mm, 9 mm, 10 mm, 11 mm, 12 mm, 13 mm, 14 mm or 15 mm, which is not limited here. If the length of the preset distance S is too large, the viewing angle width of light emitting of backlight may be affected, if the length is too small, the improving effect is not obvious, and therefore, the size of the preset distance S needs to be designed based on the actual light emitting situation of the backlight module and the size of the backlight module.

Figure 8:
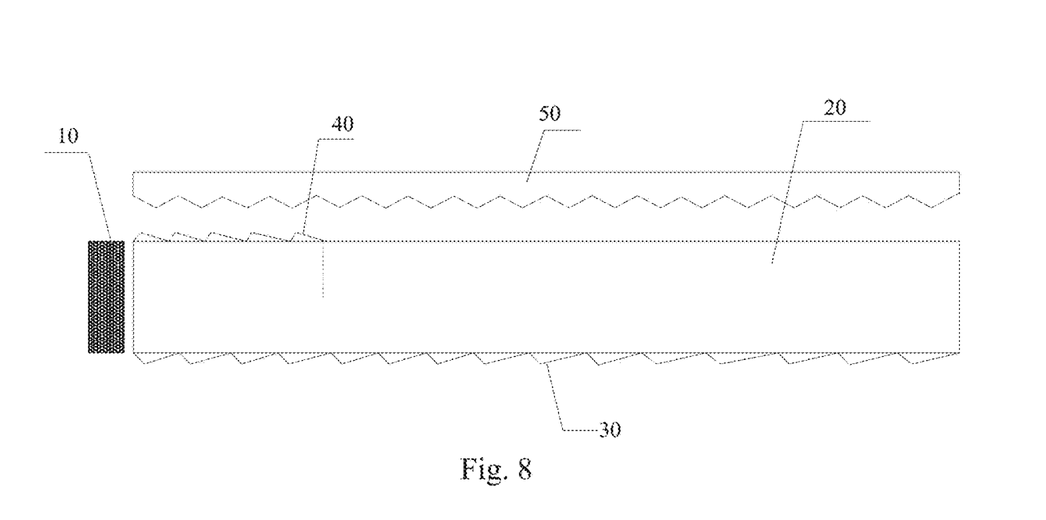
FIG. 8 is a second schematic cross-sectional view of a backlight module provided by an embodiment of the present disclosure.

Optionally, in the backlight module provided by embodiments of the present disclosure, as shown in FIG. 8, the backlight module further includes: an inverse prism sheet 50.

The microprism film layer 40 is located between the inverse prism sheet 50 and the light guide plate 20.

In specific implementation, in the backlight module provided by the embodiment of the present disclosure, the structure of the inverse prism sheet is the same as an existing structure, which is not limited here. The inverse prism sheet is generally formed by micro-nano transfer or cutter wheel processing, which is not limited here.

Figure 6A:
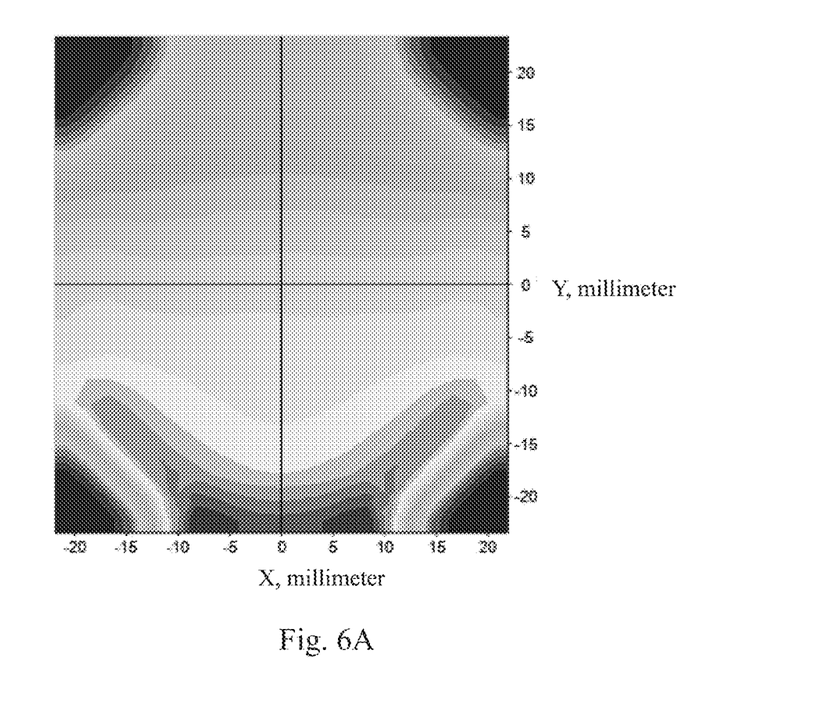
FIG. 6A is a schematic diagram of an illuminance simulation result of a backlight emitting surface of an existing backlight module.
Figure 6B:
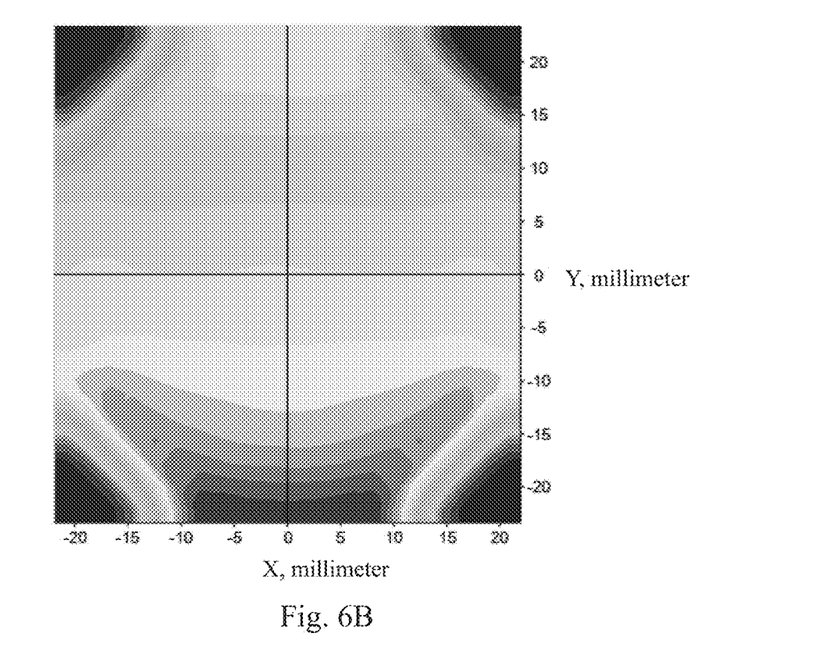
FIG. 6B is a schematic diagram of an illuminance simulation result of a backlight emitting surface of a backlight module provided by an embodiment of the present disclosure.
Figure 7:
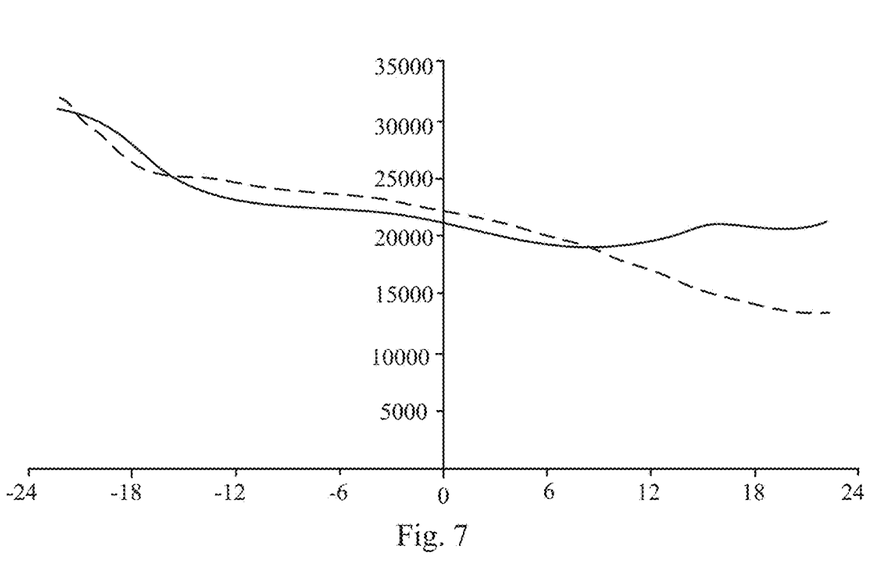
FIG. 7 is a comparison curve of illuminance data in a first direction.

Optionally, a 2.48-inch backlight module is used as an example for testing. When the microprism film layer is not arranged in the backlight module, an illuminance result of a backlight emitting surface simulated by optical modeling software (Light tools) is as shown in FIG. 6A. When the microprism film layer is added to the backlight module, the preset distance S is equal to 10 mm, l1=l2=0.2 mm, the pattern of second microprism structures is the same as the pattern of the first microprism structures, wherein α=2°, β=45°, $\gamma_1=\gamma_2=45°$, b=54 μm, a=58 μm, and h=2 μm, and an illuminance result of a backlight emitting surface simulated by the optical modeling software (Light tools) is as shown in FIG. 6B. It can be seen from FIG. 6A, FIG. 6B and FIG. 7 that, when the microprism film layer is added to the backlight module, the dark state of the backlight on the light source side may be effectively improved. The dotted line in FIG. 7 represents a comparison curve of illuminance data of FIG. 6A in the first direction, and the solid line represents a comparison curve of illuminance data of FIG. 6B in the first direction. From a negative value to a positive value, a horizontal axis is represented to be from the side away from the light source to the side close to the light source in sequence.

In summary, the backlight module provided by the embodiment of the present disclosure has the following advantages: 1, the phenomenon that the light source side of the direction backlight is dark can be effectively improved; 2, the thickness and macro size of the backlight module do not need to be changed; 3, the brightness viewing angle and the light emitting angle of the backlight are not changed; and 4, the technology is simple and feasible.

Based on the same inventive concept, the embodiment of the present disclosure further provides a display apparatus, including a liquid crystal display panel and any one of the backlight modules provided by the embodiment of the present disclosure. Since the principle of solving the problem of the display apparatus is similar to that of the aforementioned backlight module, the implementation of the display apparatus may refer to the implementation of the aforementioned backlight module, and the repetition is omitted.

In specific implementation, the display apparatus may be applied to vehicle-mounted high-brightness display, notebook privacy display, VR high-brightness display and the like, which is not limited here.

In the above-mentioned backlight module and display apparatus provided by some embodiments of the present disclosure, the microprism film layer is further arranged on the light emitting side of the light guide plate, and the microprism film layer is located within the range of the preset distance by which the light guide plate extends from the side close to the light source to the side away from the light source and the microprism film layer includes the plurality of first microprism structures, and the first microprism structures are configured to make the incident angle of the light at the first interface when entering the first microprism structures greater than the emitting angle of the light at the first interface when exiting from the first microprism structures when the light in the light guide plate enters the first microprism structures from the light guide plate and then enters the light guide plate from the first microprism structures. Compared with no microprism film layer, it is equivalent to reducing the reflection angle of the light at the first interface, so that the optical path of light emitting is shortened, the light delay is reduced, and thus, the phenomenon that the backlight module is dark close to the light source side is effectively improved without changing the brightness viewing angle and the light emitting angle of the backlight.

Obviously, those skilled in the art can make various changes and modifications to the present disclosure without departing from the spirit and scope of the present disclosure. In this way, if these modifications and variations of present disclosure fall within the scope of the claims of the present disclosure and their equivalent technologies, the present disclosure is also intended to include these modifications and variations.

What is claimed is:

1. A backlight module, comprising: a light source, a light guide plate and a microprism film layer, wherein
    light emitted by the light source is incident into the light guide plate in a side-entry mode;
    the light guide plate is provided with a plurality of dots on a backlight side thereof, and the plurality of dots and the light guide plate are an integral structure;
    a refractive index of the microprism film layer is same as that of the light guide plate, the microprism film layer is located on a light emitting side of the light guide plate, and the microprism film layer is located in a range of a preset distance by which the light guide plate extends from a side close to the light source to a side away from the light source;

the microprism film layer comprises a plurality of first microprism structures, the first microprism structures are configured to make an incident angle of light at a first interface when entering the first microprism structures greater than an emitting angle of the light at the first interface when exiting from the first microprism structures in response to that the light in the light guide plate entering the first microprism structures from the light guide plate and then entering the light guide plate from the first microprism structures, and the first interface is an interface between the light guide plate and the first microprism structures; and a pattern of the dots and a pattern of the first microprism structures are mirror-symmetrical about the light guide plate, a cross-section of each of the first microprism structures in a first direction is a triangle, a base angle of a side of the triangle away from the light source ranges from 2° to 10°, and the first direction is a direction perpendicular to the light source.

2. The backlight module according to claim 1, wherein a height of the triangle is 2 μm to 5 μm.

3. The backlight module according to claim 2, wherein a base angle of a side of the triangle close to the light source ranges from Arcsin (1/n) to 90°, and n is the refractive index of the microprism film layer; and a cross-section of each of the first microprism structures in a second direction is a trapezoid, a base angle of the trapezoid ranges from Arcsin (1/n) to 90°, and the second direction is a direction parallel to the light source.

4. The backlight module according to claim 3, wherein a length of a bottom edge of the trapezoid is 20 μm to 70 μm; and a length of a bottom edge of the triangle is 20 μm to 70 μm.

5. The backlight module according to claim 1, wherein the plurality of first microprism structures in the microprism film layer are arranged on the light emitting side of the light guide plate in a two-dimensional array;

a row direction of the two-dimensional array is parallel to the light source, and a column direction of the two-dimensional array is perpendicular to the light source;

a spacing between centers of two adjacent first microprism structures in the column direction is 0.1 mm to 0.3 mm; and a spacing between centers of two adjacent first microprism structures in the row direction is 0.1 mm to 0.4 mm.

6. The backlight module according to claim 1, wherein the light guide plate and the microprism film layer are of an integrated structure.

7. The backlight module according to claim 1, further comprising: an inverse prism sheet; wherein the microprism film layer is located between the inverse prism sheet and the light guide plate.

8. A display apparatus, comprising: a liquid crystal display panel and a backlight module, wherein the backlight module comprises: a light source, a light guide plate and a microprism film layer, wherein light emitted by the light source is incident into the light guide plate in a side-entry mode;

the light guide plate is provided with a plurality of dots on a backlight side thereof, and the plurality of dots and the light guide plate are an integral structure;

a refractive index of the microprism film layer is same as that of the light guide plate, the microprism film layer is located on a light emitting side of the light guide plate, and the microprism film layer is located in a range of a preset distance by which the light guide plate extends from a side close to the light source to a side away from the light source;

the microprism film layer comprises a plurality of first microprism structures, the first microprism structures are configured to make an incident angle of light at a first interface when entering the first microprism structures greater than an emitting angle of the light at the first interface when exiting from the first microprism structures in response to that the light in the light guide plate entering the first microprism structures from the light guide plate and then entering the light guide plate from the first microprism structures, and the first interface is an interface between the light guide plate and the first microprism structures; and a pattern of the dots and a pattern of the first microprism structures are mirror-symmetrical about the light guide plate, a cross-section of each of the first microprism structures in a first direction is a triangle, a base angle of a side of the triangle away from the light source ranges from 2° to 10°, and the first direction is a direction perpendicular to the light source.

9. The display apparatus according to claim 8, wherein a height of the triangle is 2 μm to 5 μm.

10. The display apparatus according to claim 9, wherein a base angle of a side of the triangle close to the light source ranges from Arcsin (1/n) to 90°, and n is the refractive index of the microprism film layer; and a cross-section of each of the first microprism structures in a second direction is a trapezoid, a base angle of the trapezoid ranges from Arcsin (1/n) to 90°, and the second direction is a direction parallel to the light source.

11. The display apparatus according to claim 10, wherein a length of a bottom edge of the trapezoid is 20 μm to 70 μm; and a length of a bottom edge of the triangle is 20 μm to 70 μm.

12. The display apparatus according to claim 8, wherein the plurality of first microprism structures in the microprism film layer are arranged on the light emitting side of the light guide plate in a two-dimensional array;

a row direction of the two-dimensional array is parallel to the light source, and a column direction of the two-dimensional array is perpendicular to the light source;

a spacing between centers of two adjacent first microprism structures in the column direction is 0.1 mm to 0.3 mm; and a spacing between centers of two adjacent first microprism structures in the row direction is 0.1 mm to 0.4 mm.

13. The display apparatus according to claim 8, wherein the light guide plate and the microprism film layer are of an integrated structure.

14. The display apparatus according to claim 8, wherein the backlight module further comprises: an inverse prism sheet; wherein the microprism film layer is located between the inverse prism sheet and the light guide plate.

* * * * *

UNITED STATES PATENT AND TRADEMARK OFFICE
CERTIFICATE OF CORRECTION

Page 1 of 1

PATENT NO. : 11,635,656 B2
APPLICATION NO. : 17/344054
DATED : April 25, 2023
INVENTOR(S) : Qiuli Wang et al.

It is certified that error appears in the above-identified patent and that said Letters Patent is hereby corrected as shown below:

On the Title Page

Item (73), Assignee, change to -- Beijing BOE Optoelectronics Technology Co., Ltd., Beijing (CN); BOE Technology Group Co., Ltd., Beijing (CN) --

Signed and Sealed this
Eighteenth Day of July, 2023

Katherine Kelly Vidal
*Director of the United States Patent and Trademark Office*